United States Patent
Sergyeyenko et al.

(10) Patent No.: US 7,430,810 B2
(45) Date of Patent: Oct. 7, 2008

(54) LASER SQUARE PROTRACTOR KIT

(75) Inventors: Oleksiy P. Sergyeyenko, Brockville (CA); James D. Marshall, Mallorytown (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/169,612

(22) Filed: Jun. 29, 2005

(65) Prior Publication Data

US 2006/0037205 A1 Feb. 23, 2006

Related U.S. Application Data

(63) Continuation-in-part of application No. 10/920,593, filed on Aug. 18, 2004, now abandoned.

(51) Int. Cl.
*B43L 7/10* (2006.01)
*G01C 15/00* (2006.01)

(52) U.S. Cl. .............. 33/426; 33/286; 33/424; 33/DIG. 21

(58) Field of Classification Search .......... 33/227, 33/286, DIG. 21, 274, 275 R, 285, 418, 419, 33/422, 424, 425, 426, 760, 421, 465, 468, 33/471, 484, 486, 472, 452, 228, 281, 282, 33/451, 376, 1 R
See application file for complete search history.

(56) References Cited

U.S. PATENT DOCUMENTS

| | | | |
|---|---|---|---|
| 659,513 A * | 10/1900 | Dubus | 33/353 |
| 1,024,863 A * | 4/1912 | Myers | 33/419 |
| 1,855,394 A * | 4/1932 | Hill | 33/374 |
| 1,963,805 A * | 6/1934 | Walter et al. | 33/340 |
| 2,412,084 A * | 12/1946 | Gieske | 33/419 |
| 2,412,100 A * | 12/1946 | Smith | 33/418 |
| 2,728,990 A * | 1/1956 | Murch | 33/424 |
| 2,810,198 A * | 10/1957 | Wilson | 33/342 |
| 3,097,430 A | 7/1963 | Lewinski | |
| 3,117,480 A | 1/1964 | Peddinghaus | |
| 3,504,716 A | 4/1970 | Bush | |
| 3,826,006 A * | 7/1974 | Rushin | 33/437 |
| 4,503,740 A | 3/1985 | Brand et al. | |
| 4,562,649 A * | 1/1986 | Ciavarella | 33/419 |
| 4,665,617 A | 5/1987 | Maier | |
| 4,833,782 A | 5/1989 | Smith | |
| 4,885,967 A | 12/1989 | Bell et al. | |
| 4,887,193 A | 12/1989 | Dieckmann | |
| 5,038,481 A | 8/1991 | Smith | |

(Continued)

FOREIGN PATENT DOCUMENTS

DE 90 10 716.0 10/1990

(Continued)

*Primary Examiner*—G. Bradley Bennett
*Assistant Examiner*—Amy Cohen Johnson
(74) *Attorney, Agent, or Firm*—Harness, Dickey & Pierce, P.L.C.

(57) ABSTRACT

A laser, square, protractor kit has a laser marker with a housing. The housing has a first positioning member. The protractor has a base with a second positioning member which cooperates with the first positioning member to position the housing on the protractor base. The protractor base also includes a third positioning member. A framing square is coupled with the third positioning member enabling the protractor to be positioned on the framing square.

13 Claims, 8 Drawing Sheets

U.S. PATENT DOCUMENTS

| | | | |
|---|---|---|---|
| 5,075,977 A | 12/1991 | Rando | |
| 5,118,184 A * | 6/1992 | Kordana | 356/140 |
| 5,226,238 A * | 7/1993 | Rahnefeld | 33/419 |
| 5,285,708 A | 2/1994 | Bosten et al. | |
| 5,367,779 A | 11/1994 | Lee | |
| 5,375,495 A | 12/1994 | Bosten et al. | |
| 5,442,864 A * | 8/1995 | Erman | 33/376 |
| 5,446,969 A * | 9/1995 | Terenzoni | 33/419 |
| 5,461,790 A | 10/1995 | Olstowski | |
| 5,539,990 A | 7/1996 | Le | |
| 5,594,993 A | 1/1997 | Tager et al. | |
| 5,604,987 A * | 2/1997 | Cupp | 33/275 R |
| 5,675,899 A | 10/1997 | Webb | |
| 5,782,007 A * | 7/1998 | Harris | 33/768 |
| 5,838,431 A | 11/1998 | Hara et al. | |
| 5,862,727 A | 1/1999 | Kelly | |
| 5,864,956 A | 2/1999 | Dong | |
| 5,872,657 A | 2/1999 | Rando | |
| 5,918,523 A | 7/1999 | Cutter | |
| 5,949,810 A | 9/1999 | Star et al. | |
| 5,996,460 A | 12/1999 | Waite | |
| 6,209,219 B1 | 4/2001 | Wakefield et al. | |
| 6,222,625 B1 * | 4/2001 | Johnston | 356/247 |
| 6,263,584 B1 | 7/2001 | Owens | |
| 6,397,717 B1 | 6/2002 | Waite | |
| 6,415,518 B1 * | 7/2002 | Sims | 33/286 |
| 6,453,568 B1 * | 9/2002 | Hymer | 33/276 |
| 6,481,322 B1 | 11/2002 | Hsiung | |
| 6,487,783 B1 * | 12/2002 | Thomas, Jr. | 33/414 |
| 6,497,168 B1 | 12/2002 | Levine | |
| 6,539,638 B1 | 4/2003 | Pelletier | |
| 6,578,459 B2 | 6/2003 | Waite | |
| 6,581,296 B2 | 6/2003 | Ponce | |
| 6,584,695 B1 | 7/2003 | Chang | |
| 6,604,296 B2 * | 8/2003 | Mastrobattista | 33/640 |
| D486,369 S | 2/2004 | Keller | |
| 6,692,200 B2 | 2/2004 | Peterson | |
| 6,735,879 B2 | 5/2004 | Malard et al. | |
| 6,739,062 B2 * | 5/2004 | Jan et al. | 33/286 |
| 6,839,974 B1 * | 1/2005 | Hitchcock | 33/473 |
| 6,895,675 B2 * | 5/2005 | Albright et al. | 33/42 |
| 6,944,962 B2 * | 9/2005 | Tessel et al. | 33/414 |
| 7,024,791 B2 * | 4/2006 | Marshall et al. | 33/768 |
| 7,076,879 B2 * | 7/2006 | Murphy | 33/284 |
| 7,121,010 B2 * | 10/2006 | Marshall et al. | 33/286 |
| 7,137,209 B2 * | 11/2006 | Northern et al. | 33/371 |
| 7,254,899 B2 * | 8/2007 | Marocco et al. | 33/760 |
| 2001/0049988 A1 | 12/2001 | Ushiwata et al. | |
| 2002/0178596 A1 | 12/2002 | Malard et al. | |
| 2003/0231303 A1 | 12/2003 | Raskin et al. | |
| 2006/0037205 A1 * | 2/2006 | Sergyeyenko et al. | 33/426 |

FOREIGN PATENT DOCUMENTS

| | | |
|---|---|---|
| DE | 39 22 849 A1 | 1/1991 |
| DE | 203 01 472 U1 | 7/2003 |
| DE | 102 61 904 A1 | 11/2003 |
| EP | 0 504 745 A1 | 9/1992 |
| GB | 2 388 571 A | 11/2003 |
| WO | WO 93/03878 | 3/1993 |

* cited by examiner

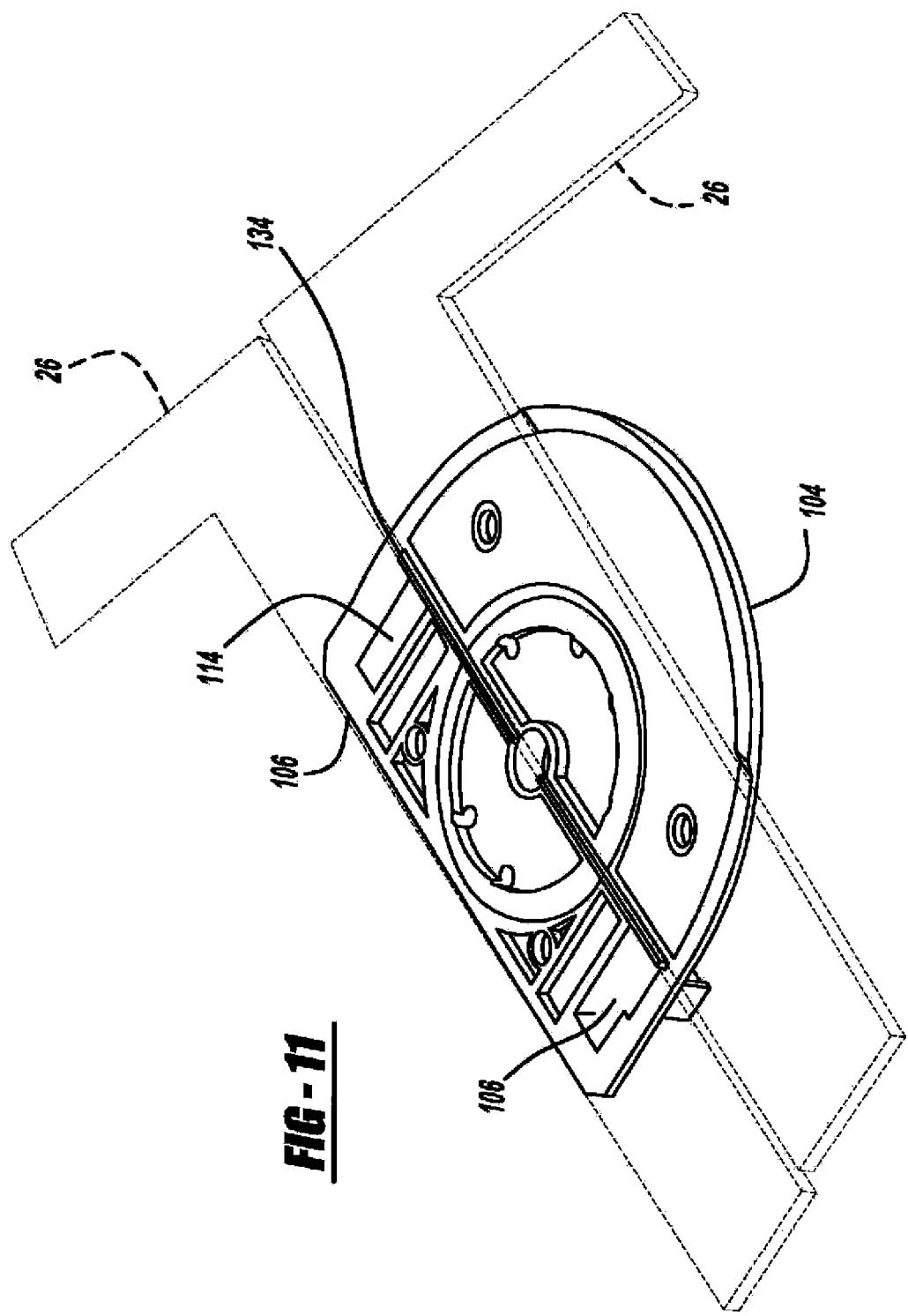

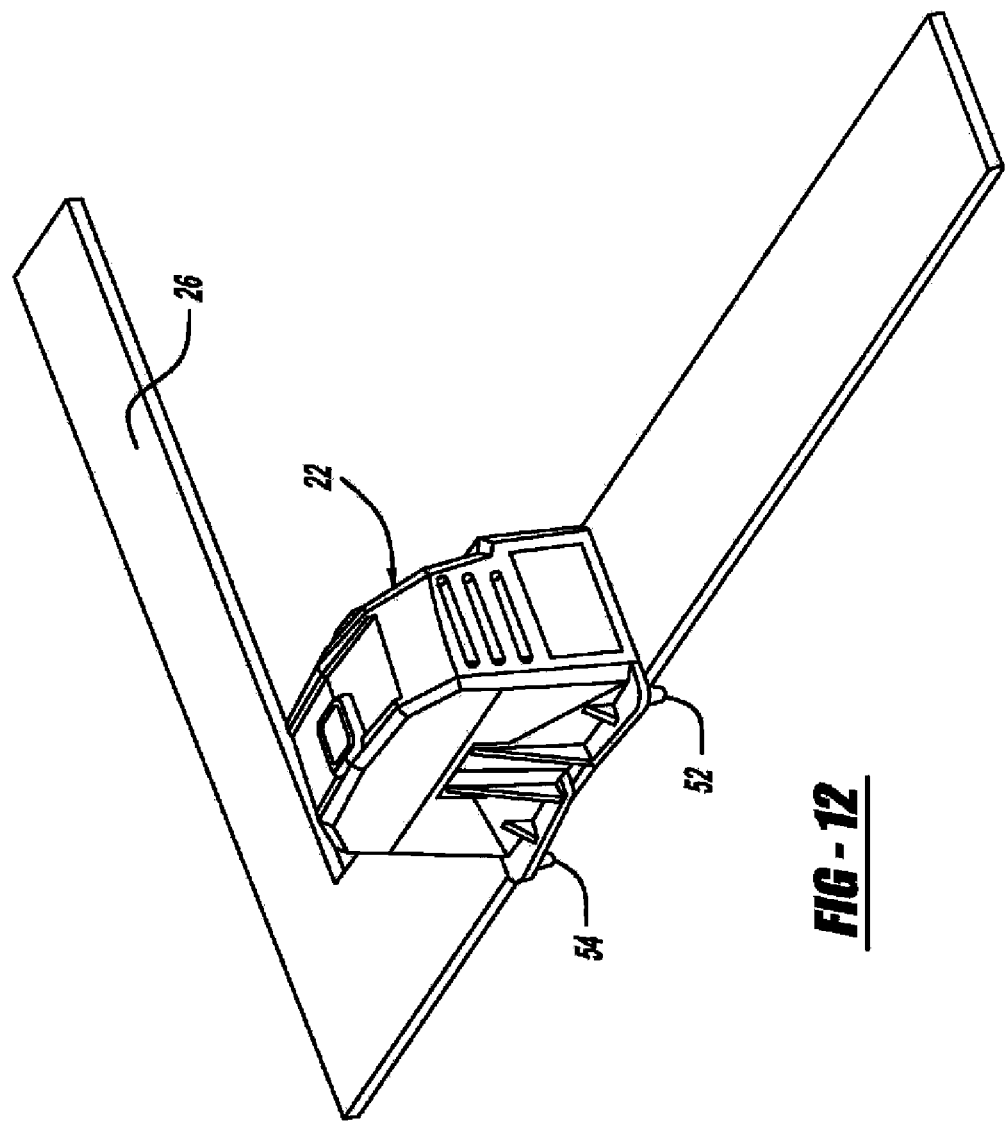

LASER SQUARE PROTRACTOR KIT

CROSS-REFERENCE TO RELATED APPLICATIONS

The present invention is a continuation-in-part application of U.S. patent application Ser. No. 10/920,593 entitled "Circular Saw with Laser and Protractor" filed on Aug. 18, 2004, now abandoned the specification and drawings of which are hereby expressly incorporated by reference.

BACKGROUND OF THE INVENTION

The present invention relates to a measuring kit and, more specifically, to a measuring kit that includes a laser, framing square, protractor and their combinations.

In the construction industry, as well as other industries, laser markers are becoming commonly used throughout the industry. Laser beams can serve as a line mark for use in diverse processes such as guiding, aligning, and locating. The laser markers can be used to lay out and determine the configuration of a construction project.

Ordinarily, in forming various types of elements which require various angles, cuts and the like, it is desirable to utilize a tool which will enable the project to be level and square. In order to accomplish leveling and squareness, the workman must perform various measurements in order to obtain the desired results. Often times, it is difficult to accurately perform these measurements. Thus, it would be desirable to have tools which enhance the workman's ability to provide accurate and precise measurements as well as accurate and precise leveling and squareness.

The present invention provides the user with a kit which enables accurate measurement. The kit provides a laser marker which can be angularly adjusted along a protractor. Also, the present invention provides a squaring feature wherein the laser beam can be squared onto the workpiece and provide a straight and accurate marking. The present invention provides a squaring device which enables precise layout of a project.

According to a first aspect of the invention, a laser square protractor kit comprises a laser having a housing with a first positioning member coupled with the housing. The protractor has a base with a second positioning member. The first and second positioning members cooperate with one another to position the housing with the protractor base. The protractor base includes a third positioning member. A framing square is adapted to couple with the base in the third positioning member. The base further includes a reference edge to square the protractor on a workpiece. The reference edge is pivotable from a first extending position projecting from the base, to provide squareness, to a retracted position where it is flush with the base. The base also includes a second reference member to reference the framing square with the protractor base. The second reference edge projects from the base. The base also includes a projecting support member which, with the reference edge, forms a channel to receive the framing square. The base includes registration members to position the laser housing about a plurality of predetermined angled positions on the protractor. Also, the laser housing is adjusted to any angle of the protractor.

In accordance with the second embodiment of the invention, a laser protractor kit comprises a laser having a housing and a first positioning member coupled with the housing. The protractor has a base with a second positioning member. The first and second positioning members cooperate with one another to position the housing with the protractor base. The base includes a reference edge member to square the protractor on a workpiece. The edge member is pivotable from an extended position, projecting from the base for squaring, to a retracted position flush with the base. The base also includes registration members to position the laser about a plurality of predetermined angled positions on the protractor.

According to a third aspect of the invention, a laser and framing square kit comprises a laser having a housing with at least one positioning member extending from the housing. A framing square has at least one edge. The at least one edge cooperates with the at least one positioning member to position the laser housing with the framing square. The laser housing ordinarily includes a pair of positioning members projecting from the housing. The pair of members are spaced with respect to one another to contact the at least one edge of the framing square. The framing square has at least two edges spaced and parallel from one another. The pair of positioning members on the housing may be positioned such that each member cooperates with one of the two edges of the framing square.

From the following detailed description taken in conjunction with the accompanying drawings and claims, other objects and advantages of the present invention will become apparent to those skilled in the art.

BRIEF DESCRIPTION OF THE DRAWINGS

The present invention will become more fully understood from the detailed description and the accompanying drawings, wherein:

FIG. 11 is a perspective view of the bottom of the protractor.

FIG. 12 is a perspective view of the laser generator and the framing square.

DETAILED DESCRIPTION OF THE PREFERRED EMBODIMENTS

The following description of the preferred embodiment(s) is merely exemplary in nature and is in no way intended to limit the invention, its application, or uses.

Figure 1:
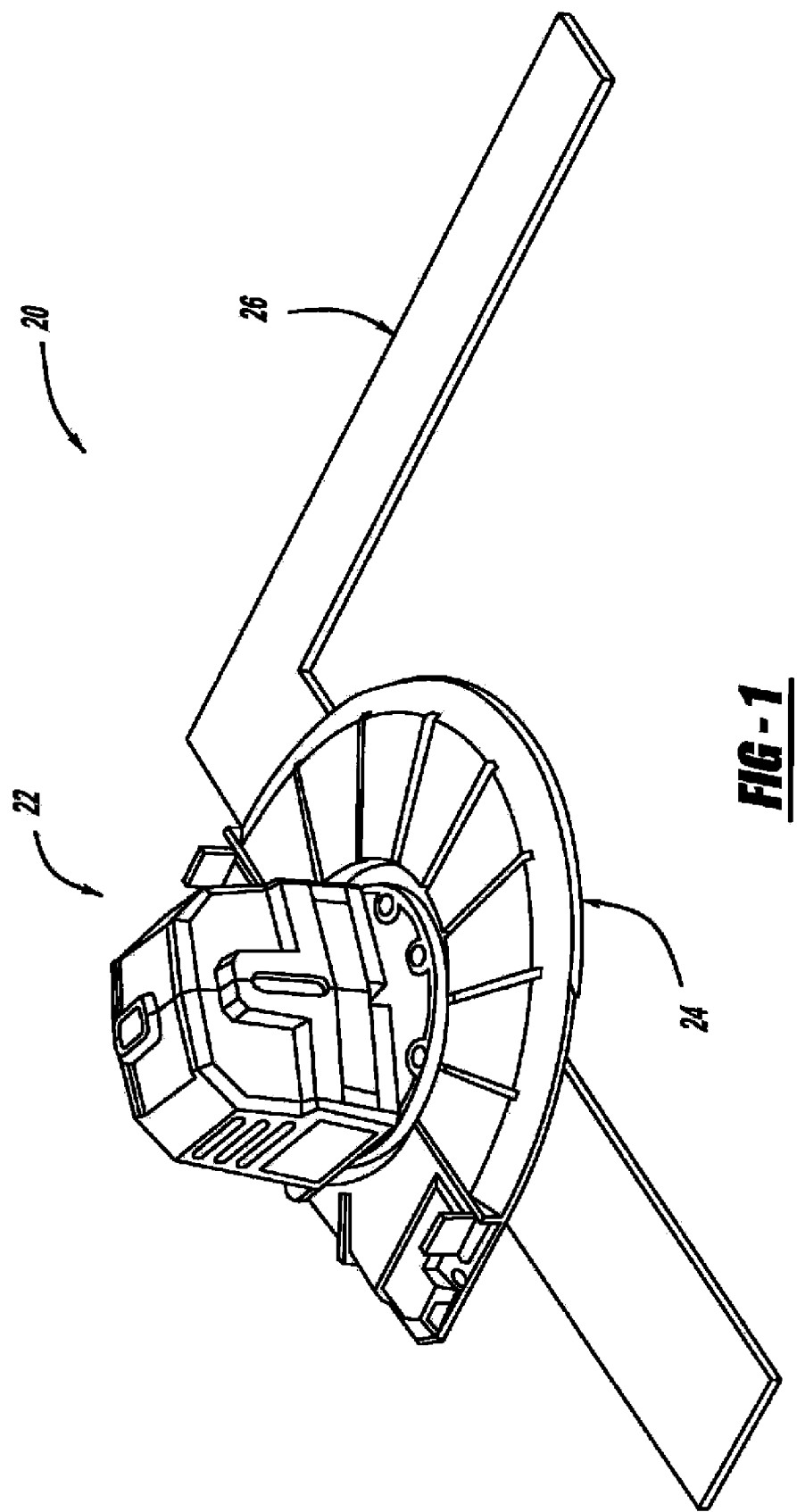
FIG. 1 is a perspective view of the laser protractor framing square kit in an assembled position.
Figure 2:
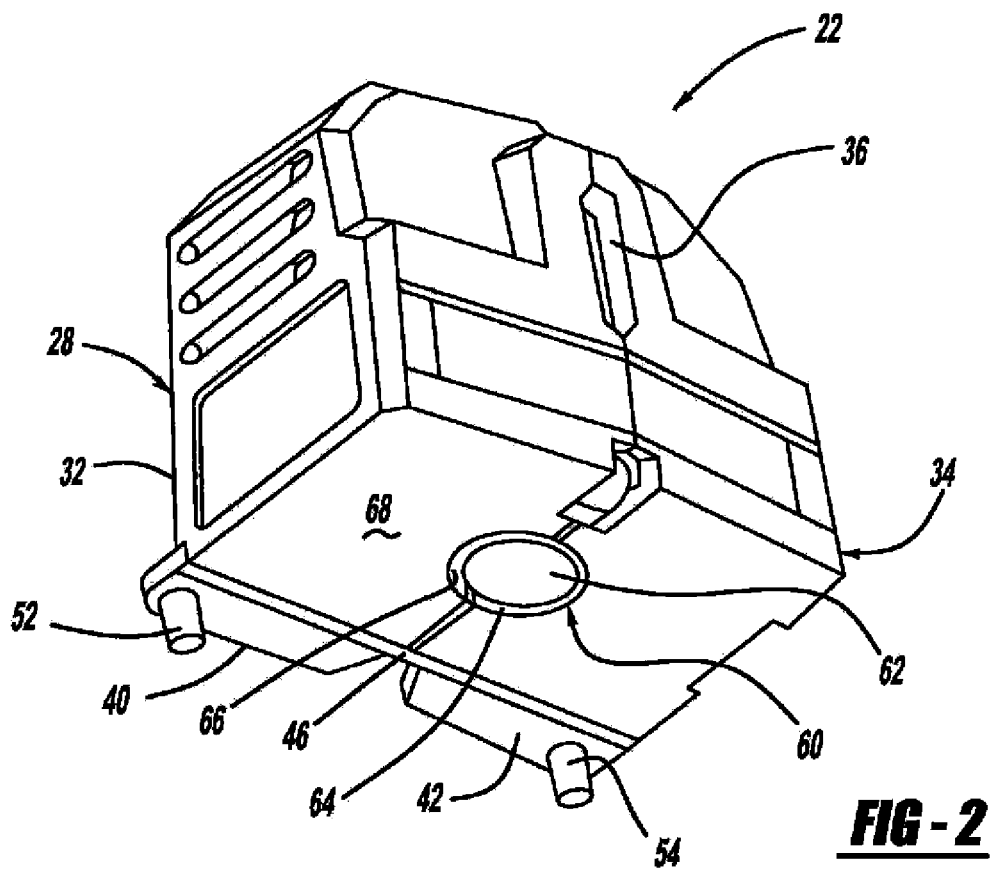
FIG. 2 is a bottom perspective view of the laser generator.
Figure 3:
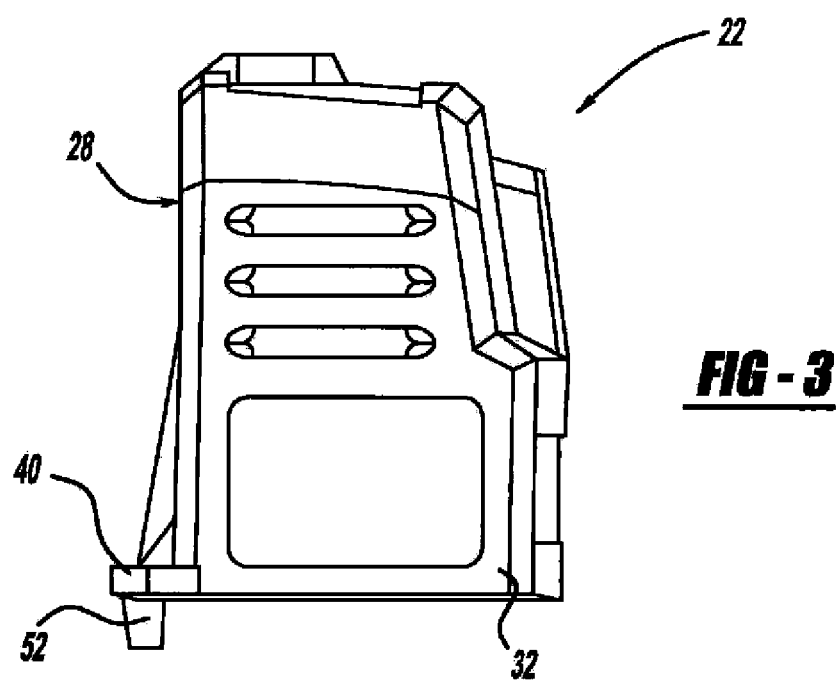
FIG. 3 is a side elevation view of the laser generator of FIG. 2.

Turning to the figures, particularly FIG. 1, the laser beam generator, protractor and framing square kit is illustrated and designated with the reference numeral 20. The kit 20 includes a laser generator 22, a protractor mechanism 24, and a framing square 26. As seen in FIG. 1, the laser generating member 22 removably nests on the protractor 24. Also, the framing square 26 removably nests underneath the protractor 24.

The laser generator or marker 22 is like that described in U.S. application Ser. No. 10/920,593 entitled "Circular Saw with Laser and Protractor", filed on Aug. 18, 2004 and assigned to the same assignee as the present invention, the specification and drawings of which are herein expressly incorporated by reference. The laser generator includes a housing 28 which is formed from a pair of shell-like sections 32, 34. A window 36 is formed generally centrally between the two shell-like sections 32, 34. The window 36 enables the laser to project from the window 36. The rear wall of the housing includes two shelves 40, 42 each of which extends perpendicular from the wall. Each of the shelves 40, 42 is formed with a tapered section which tapers inward from the outboard ends to a slot between respective inboard ends. A marking notch 46 with an alignment mark is located within the slot. The notch 46 is in alignment with the window 36 and a laser beam which is eventually projected through the window 36. This arrangement facilitates the locating of the laser housing on a surface of a workpiece with respect to a reference point on the surface. An undersurface of the rear wall is flush with an external surface of the housing base with the undersurface and the external surface being located in a common external plane. The wall is formed with a first reference or support leg 52 and a second reference or support leg 54. The first and second support legs 52, 54 are spaced with respect to one another. Each of the spaced first and second legs 52, 54 extend perpendicular and outward from the base by a prescribed extension distance from the undersurface of the wall section. Also, the legs 52, 54 may be used to align the laser marker 22 on the edge of a workpiece to project a line perpendicular to the edge.

A nest 60 is formed in a central location of the base to receive a magnet 62. The magnet 62 has a disk shape. The nest 60 includes the passage 64 of a desired diameter, which extends through the base from a generally central portion of the external surface and inward of the laser housing. A ledge (not shown) is formed about an inboard portion of the passage at a diameter larger than the prescribed diameter of the passage. The magnet 62 is formed with a diameter which is approximately the same as the diameter of the ledge. Thus, when the magnet 62 is placed on the ledge, the ledge forms a mechanism to locate the magnet 62 within the laser housing to preclude movement of the magnet 62 out of the nest in the direction outward of the laser housing. One side of the magnet is exposed externally out of the housing. The externally exposed outward portion of the passage 64 and the external exposed portion of the magnet 62 form a circular recess 66 which extends inward from the base 68 the desired distance. This receives the protractor boss as will be explained herein.

Figure 7:
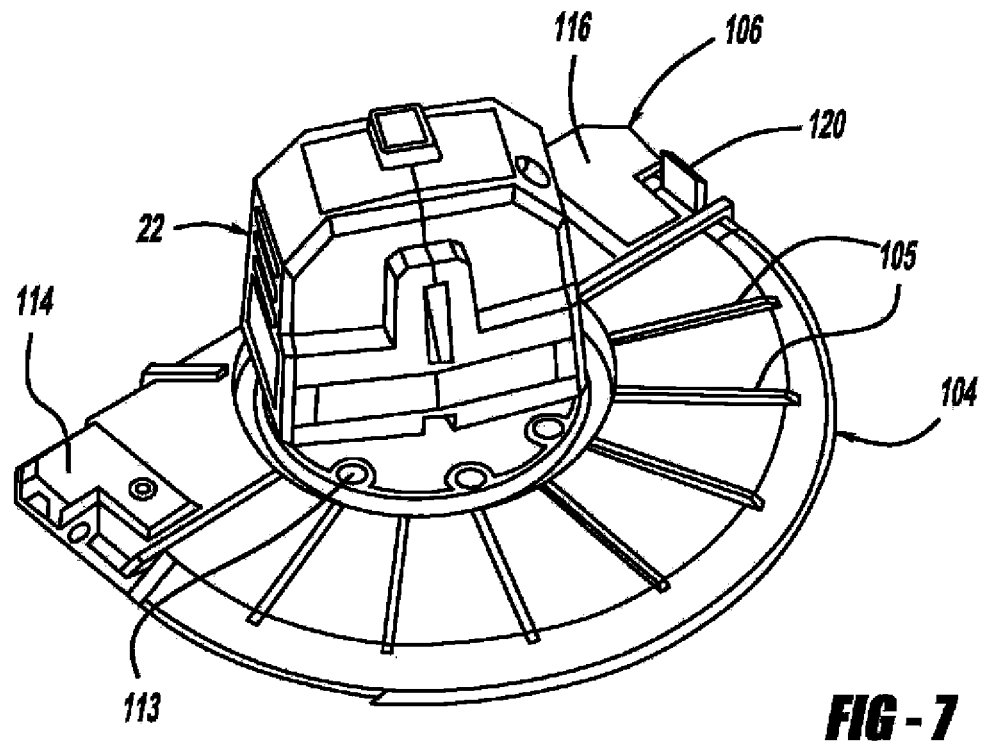
FIG. 7 is a perspective view of the laser and protractor.
Figure 8:
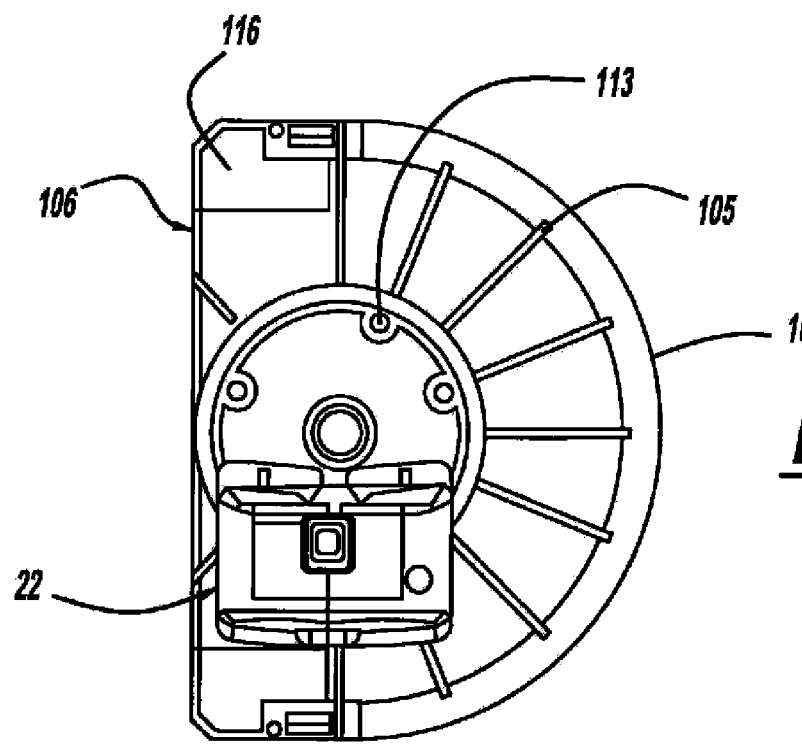
FIG. 8 is a top plan view of the laser on the protractor in the desired position.
Figure 9:
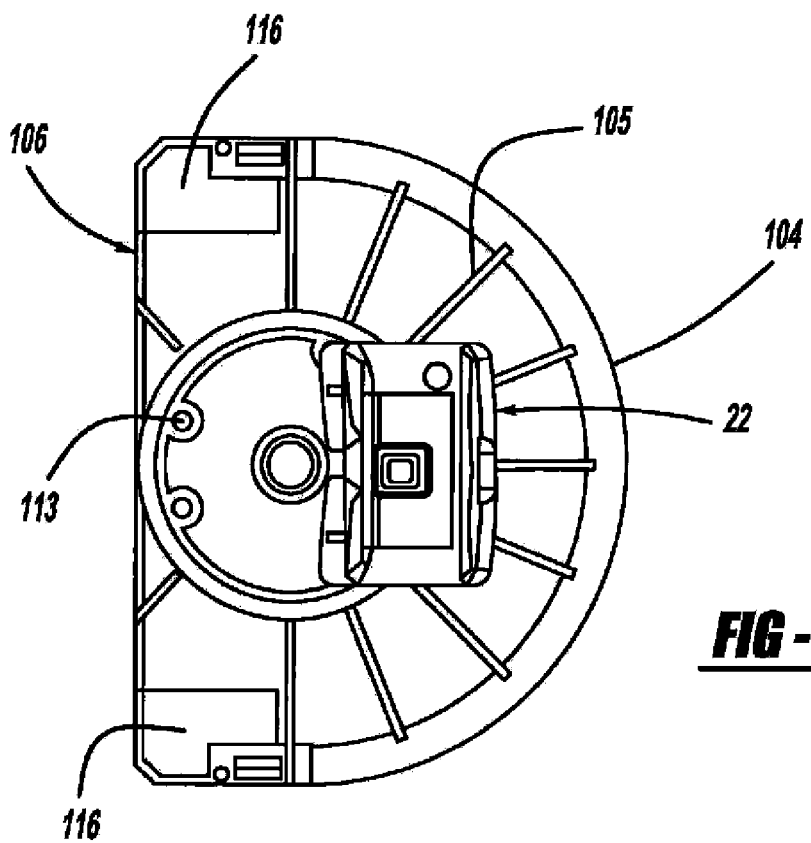
FIG. 9 is a view like FIG. 8 with the laser generator in a second desired position.
Figure 10:
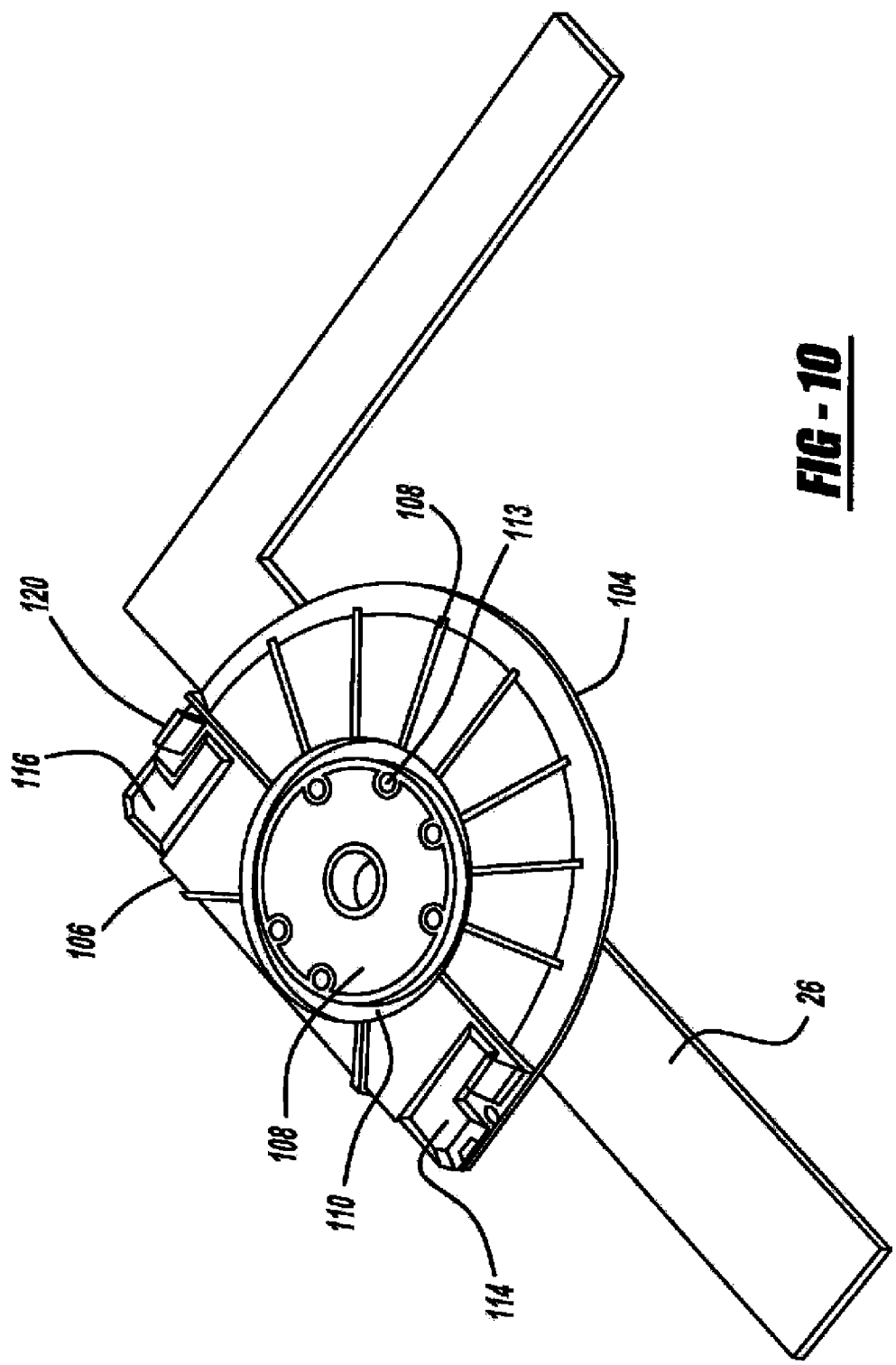
FIG. 10 is a perspective view of the protractor and framing square.

The protractor 24 includes a base 102 which includes a semi-circular portion 104 and a rear rectangular portion 106. The semi-circular portion 104 may include a scale with numeral 0-180 identifying the various degree angles. The rectangular portion 106 is continuous with the semi-circular portion 104. The semi-circular portion 104 may also include raised radiants 105 which illustrate various common degrees such as 0, 30, 45, 60, 90, 120, 135, 150 and 180. Also, a circular boss 108 and groove 110 may be positioned between the semi-circular portion 104 and the rectangular portion 106. The boss 108 includes at its center, a central disk 112 which receives the magnet 62 of the laser marker 20. The circular member 112 is centered on the protractor baseline and includes a raised metallic portion which fits into the recess of the housing. Alternatively, a friction fit mechanism, which provides the rotation feature, could be used. The boss 108 includes a plurality of apertures 113 to receive the legs 64, 66 of the housing as illustrated in FIGS. 7-9. The apertures 113 are positioned such that the laser marker is positioned at the desired identified radiant. Thus, by moving the laser housing pins 52, 54 from hole to hole 113, a different angular position can be determined. Also, due to the circular recess 66 and boss 108, the laser marker 22 may be rotated to any desired degree angle.

Figure 5:
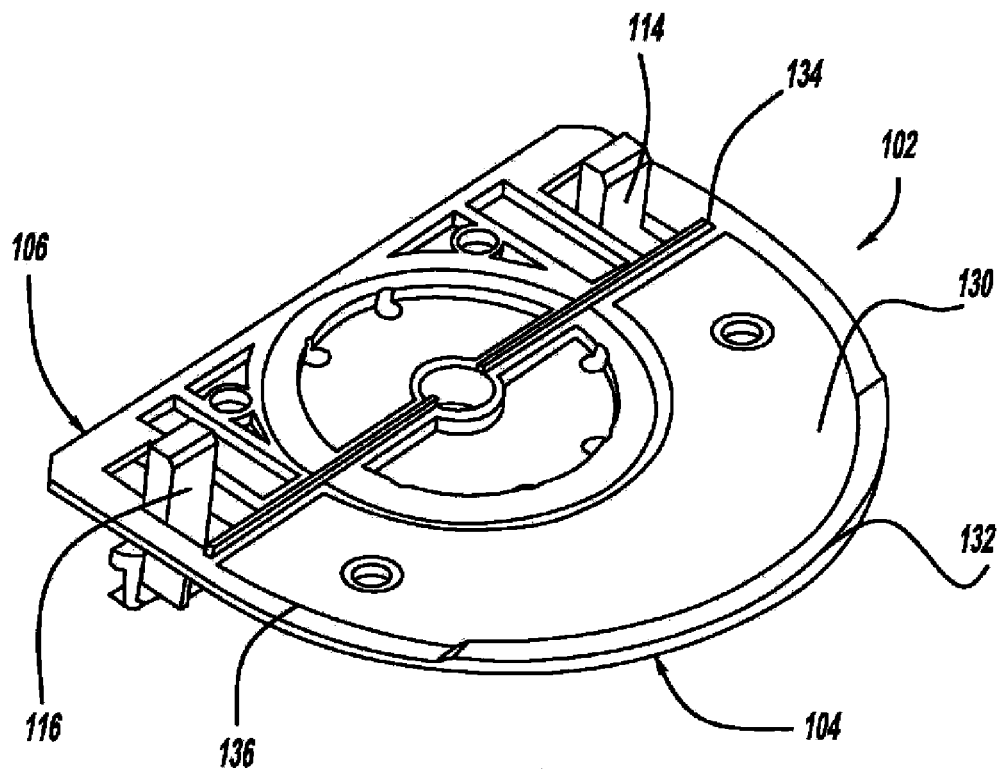
FIG. 5 is a perspective view of the bottom of the protractor base.
Figure 6:
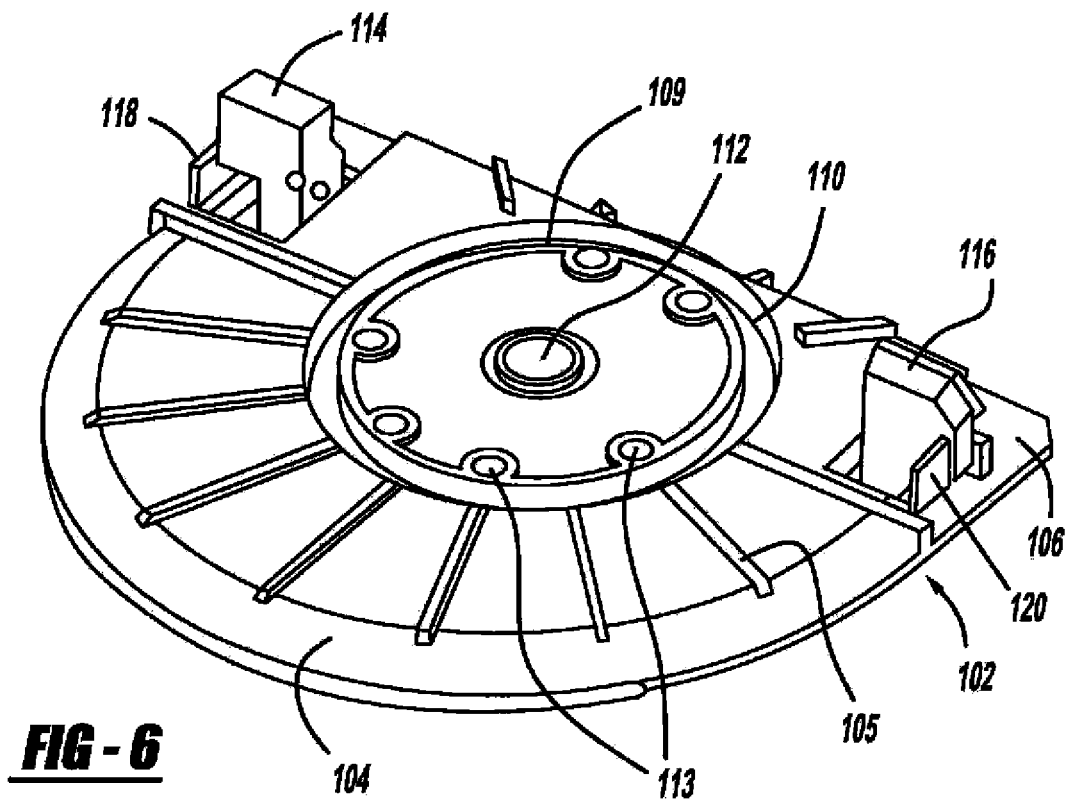
FIG. 6 is a perspective top view of the protractor base.

The rectangular backing member 106 includes a pair of reference members 114, 116. The reference members are pivotally secured to the backing member 106. The reference members 114, 116 enable the protractor 24 to be referenced onto a workpiece. Likewise, when the protractor 24 is to be positioned in a non-reference point, the reference members 114, 116 are pivoted so that they are flush with the protractor and therefore do not extend from the bottom of the protractor as illustrated in FIG. 5. Thus, the reference members can be pivoted from a first to a second position to align and enable the protractor to be positioned against the edge of a workpiece. Also, the protractor includes stops 118, 120 which stop the travel of the reference members 114, 116. The stops position the reference members 114, 116 perpendicular to the rectangular portion of the base 106.

Figure 4:
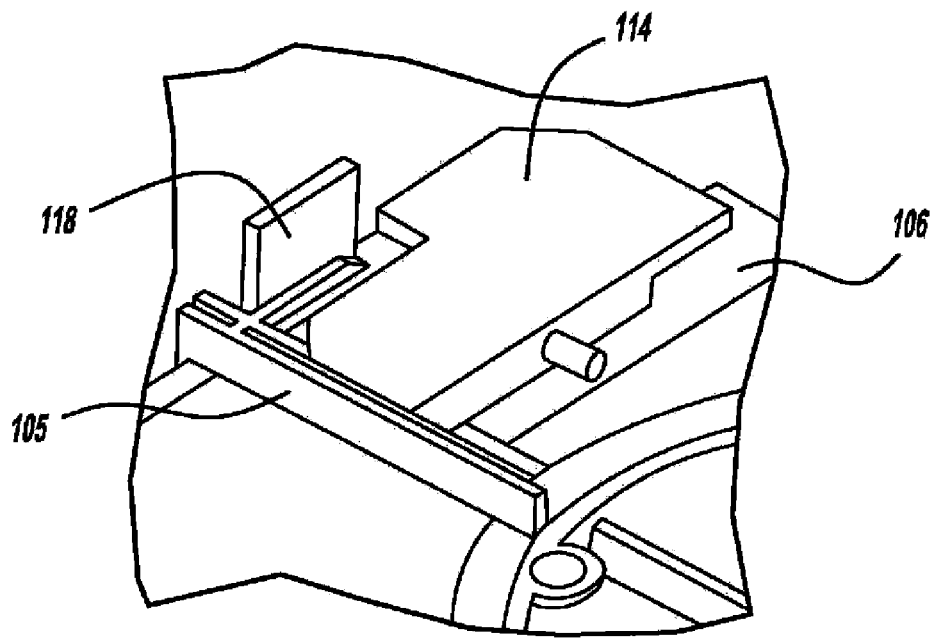
FIG. 4 is a detailed perspective view of a reference member of the protractor.

The protractor base 102 includes a bottom surface 130. The bottom surface 130 includes a leg 132 on the front semi-circular portion 104. Also, the bottom 130 includes a reference edge 134. The reference edge 134 can be a metallic member which extends from the bottom 130. The reference edge 134 is positioned along the zero baseline of the protractor. The reference edge 134 and the leg 132 form a channel 136 which receives the framing square 26. Thus, the framing square 26 can be slid longitudinally in the channel 136. Also, when the reference members 114, 116 are in their flush position, as illustrated in FIGS. 4 and 11, the framing square 26 can be positioned on either side of the reference edge 134. The framing square 26 can be positioned under the rectangular portion 106 for measurement on either side of the protractor. Further, the reference edge 134 can abut the edge of a workpiece or wall to align the protractor.

The framing square 26 is generally formed from a metallic material and includes two leg portions perpendicular to one another forming an L-shape. The framing square 26 has a thickness conventional in the art which can easily slide into, or enable the protractor 24 to slide on via, the channel 136 between the reference edge 134 and leg 132 of the protractor 24. Also, the edge is such that the framing square can slide underneath the rectangular base portion 106.

Turning to FIG. 12, the framing square 26 can be used with the laser marker 22. As seen, the legs 52, 54 are positioned against the edge of the framing square 26. The laser marker 22 can be moved into any desired position along the framing square 26. Thus, the laser marker 22 projects a line which is perpendicular to the edge of the framing square 26. The laser marker's magnet 62 holds the laser marker in position on the square. Also, the laser marker 22 could be positioned transverse to the square so that the housing legs could be riding along parallel edges of the framing square.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser, square protractor kit comprising:
   a laser having a housing, a first positioning member coupled with said housing;
   a protractor having a base, said base including a second positioning member, said first and second positioning members cooperating with one another for positioning said housing with said protractor base;

said protractor base including a third positioning member, said protractor base further comprising a reference edge member for referencing a framing square with said protractor base, said reference edge member projects from said protractor base; and said framing square for coupling with said protractor base third positioning member.

2. The laser, protractor, square kit according to claim 1, wherein said protractor base reference edge member is for squaring said protractor on a workpiece.

3. The laser, protractor, square kit according to claim 2, wherein said reference edge member is pivotable from an extended position projecting from said protractor base, providing said squaring, to a retracted position flush with said protractor base.

4. The laser, protractor, square kit according to claim 1, wherein said protractor base includes a projecting support member, said projecting support member and said reference edge member forms a channel for receiving said framing square.

5. The laser, protractor, square kit according to claim 1, wherein said protractor base includes registration members for positioning said laser about a plurality of angled positions on said protractor.

6. The laser, protractor, square kit according to claim 1, wherein said laser housing is removably coupled with said protractor.

7. A laser and protractor kit comprising:
 a laser having a housing, a first positioning member coupled with said housing; and
 a protractor having a base, said base including a second positioning member, said first and second positioning members cooperating with one another for positioning said housing with said protractor base; and
 a plurality of registration members on said base for positioning said laser housing at a plurality of different positions and orientations about said protractor for enabling a laser beam to be projected at different angles about said protractor.

8. A laser and protractor kit according to claim 7, wherein said base further comprises a reference edge member for squaring said protractor on a workpiece.

9. The laser, protractor kit according to claim 8, wherein said reference edge member is pivotable from an extended position projecting from said base, providing said squaring to a retracted position flush with said base.

10. The laser, protractor kit according to claim 7, wherein said laser housing being removably coupled with said protractor.

11. A laser and framing square kit comprising:
 a laser having a housing with a base, a pair of positioning members extending from said housing base and spaced from one another; and
 a framing square, said framing square having at least two legs, each leg having a planar surface and two edges, one on each side of said planar surface to define a width of said leg, said housing base adapted for seating on said framing square such that in a first position, said two positioning members are positioned on one edge of one of said legs of said framing square with said housing base seating on said planar surface of said leg and in a second position, said two positioning members are positioned on two edges of one of said legs spanning the width of said leg of said framing square with said housing base seating on said planar surface of said leg.

12. The laser and framing square kit according to claim 11, wherein said laser housing is removably coupled with said framing square.

13. The laser and framing square kit according to claim 11, wherein said laser projects a line at a desired angle with respect to said at least one edge.

* * * * *